April 23, 1946. P. MILLER 2,398,908
PREPARATION OF AVIATION GASOLINE FROM NORMALLY GASEOUS HYDROCARBONS
Filed Feb. 10, 1942
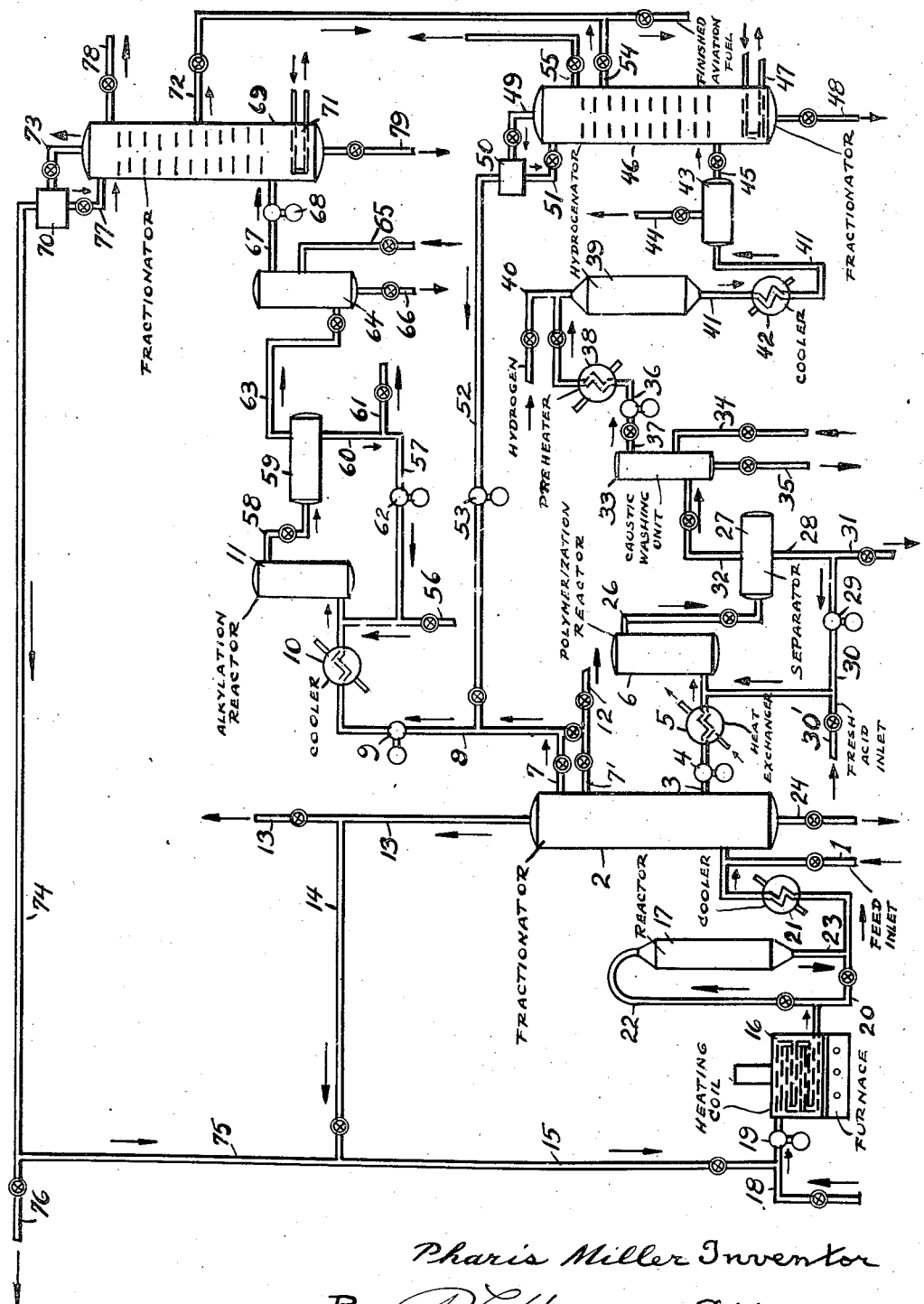
Pharis Miller Inventor
By P. L. Young Attorney Patented Apr. 23, 1946

UNITED STATES PATENT OFFICE 2,398,908

PREPARATION OF AVIATION GASOLINE FROM NORMALLY GASEOUS HYDROCARBONS

Pharis Miller, Elizabeth, N. J., assignor, by mesne assignments, to Standard Catalytic Company, a corporation of Delaware Application February 10, 1942, Serial No. 430,196

4 Claims. (Cl. 260—683.4)

This invention relates to the preparation of liquid aviation gasoline hydrocarbons from a variety of normally gaseous hydrocarbons, particularly to obtain a fuel which gives excellent performance in supercharged aircraft engines of high-power output.

While a number of processes have been developed for polymerizing and alkylating certain normally gaseous hydrocarbons to form liquid fuel ingredients, the refining industry has been confronted by the problem of how to utilize refinery gases more fully in these processes and of how to obtain therefrom the most valuable products.

As a meritorious answer to the above problem, there is herewith provided a process in which a polymerization is selectively imposed on $C_4$ olefins in the presence of $C_4$ paraffins to form one main portion of the desired final fuel product and a complementary alkylation treatment is selectively imposed on $C_2$ and $C_3$ olefins together with $C_4$ paraffins efficiently recovered from the polymerization to yield ingredients best suited as the other main portion of the desired final fuel product.

Polymerization and alkylation reactions as applied to mixtures of olefinic and paraffinic hydrocarbons are complicated and result in the formation of many types of hydrocarbons. Each of these reactions is considerably influenced by the kinds of hydrocarbons entering into the reaction as well as by the catalyst and conditions. Thus, any attempt to utilize a polymerization reaction along with an alkylation reaction offers difficulties in ascertaining the most suitable conditions, the manner of securing the reactants, and the manner of using the products and by-products of the reactions to the fullest advantage.

For the present purposes, it has been found that a preferred polymerization treatment is one in which normal butenes and iso-butene present in a $C_4$ fraction are copolymerized or interpolymerized by a hot sulfuric acid catalyst to favor the formation of iso-octene isomers boiling above 225° F. (The terms "copolymerization" and "interpolymerization" as used in this specification refer to the formation of polymers by the interaction of unlike isomeric molecules, as in the case under discussion, and "copolymers" and "interpolymers" refer to the product formed by such process.) By hydrogenating the hydrocarbons recovered from the polymerization, then fractionating out the normally liquid products, an isobutane-butane mixture is obtained in satisfactory condition for an alkylation reaction of the isobutane with the lower olefins, especially ethylene, to secure a good yield of the desired alkylate. The alkylation treatment found most satisfactory for bringing about the reaction of the lower olefins with the isobutane is preferably one wherein boron fluoride with admixed water is employed as the catalyst.

The herein provided method of applying the polymerization and alkylation treatments to selected hydrocarbon mixtures has distinct advantages over any one kind of treatment applied to all the reactive hydrocarbons involved in the present process and over combined types of treatments that fail to make the important discrimination in the substances treated or fail to apply conditions of reaction essential in obtaining the desired intermediate and final products. A complete understanding of the present invention will be obtained from the following description of a plant operation with reference to the accompanying drawing. In the drawing, the procedure is illustrated by a schematic flow plan including elevational views of apparatus units involved. The drawing is not intended to be in any accurate or relative scale, nor to contain all details of conventional refinery equipment which may be utilized.

Refinery gases, such as normally gaseous hydrocarbons from a cracking unit stabilizer, including substantial amounts of ethylene, propylene, butylenes, isobutane, and other homologous olefins and paraffins having 2 to 4 carbon atoms, may be supplied to the system thru feed inlet 1 for introduction into the base of the fractionator 2, or similar device, in order to separate a fractional condensate of $C_4$ hydrocarbons and a fractional condensate of $C_2$ and $C_3$ hydrocarbons. The $C_4$ fraction preferably should be composed substantially of normal and isomeric butanes and butenes. This cut may be removed from the fractionator by line 3 to be conducted by a pump 4 thru heat exchanger 5 to a polymerization reactor 6.

Narrow cut fractions containing $C_2$ and $C_3$ olefins and paraffins may be withdrawn from the fractionator 2 in one or more side streams by lines 7 and 7' to be conducted via line 8 by a pump 9 thru cooler 10 to an alkylation reactor 11. To reduce the $C_3$ olefin concentration in the mixture sent to the reactor 11, a portion of the side stream 7' may be eliminated thru line 12.

Gaseous substances lower boiling than ethylene, e. g., methane and hydrogen, may be expelled from the fractionator 2 thru line 13 to be used for any of several different purposes, such as for recovery of hydrogen, for use as a heating fuel, or for recycling to any desired extent by way of lines 14 and 15 to a gas cracking or dehydrogenating unit, such as carried out in a heating coil 16 and/or reactor 17.

The feed stock for the fractionator 2 may be quite variable, depending upon the supply of by-product gaseous hydrocarbons from cracking or refining operations and the amount of gases recycled in the system of the present process. A representative sample of a feed to the primary fractionator 2 has the following approximate analysis:

| Ingredients: | Volume per cent |
|---|---|
| Hydrogen and methane | 21 |
| Ethane | 11 |
| Ethylene | 14 |
| Propane | 3 |
| Propylene | 10 |
| Isobutane | 12 |
| n-Butane | 10 |
| Isobutylene | 5 |
| n-Butylenes | 12 |
| Heavier | 2 |

Gaseous hydrocarbons recycled in the system are preferably subjected to pyrolytic or catalytic cracking and/or dehydrogenation before being introduced into the primary fractionator. To effect such treatments, recycled gases from line 15 with any desired admixture of natural or refinery gases from line 18 are forced by pump 19 thru heating coil 16. For pyrolytic cracking, the hydrocarbon gases are heated to a temperature of about 1100° F. or higher. The heated gases may be discharged from the heating coil by line 20 thru cooler 21 into the base of fractionator 2. Alternatively, normally gaseous hydrocarbons fed into coil 16 may be heated to a somewhat lower temperature of about 950° F. to about 1050° F., and then be discharged thru line 22 into a reactor 17 wherein the heated hydrocarbons may be contacted with a catalyst that promotes cracking or dehydrogenation, for example, an acid-treated clay, active alumina, active silica, a difficultly reducible oxide of metals like chromium, molybdenum, tungsten, magnesium, zinc, or mixed catalytic substances of these types. From the reactor 17, the hydrocarbon products are passed by line 23 thru cooler 21 into the fractionator 2. Thus, the hydrocarbons may be treated under suitable dehydrogenating conditions and also isomerizing conditions to favor the formation of olefins and branched chain aliphatic hydrocarbons. Hydrocarbons heavier than the $C_4$ paraffins and olefins that enter fractionator 2 may be withdrawn therefrom by the bottom outlet line 24.

The $C_4$ fraction, sent from the fractionator 2 to a polymerization reactor 6, is treated therein under conditions appropriate for polymerizing and copolymerizing the $C_4$ olefins but avoiding their reaction with any of the $C_4$ paraffins, so that the $C_4$ olefins are made to form a series of isomeric octenes boiling predominantly above 225° F. Correct conditions of treatment for this purpose are the following: The titratable sulfuric acid strength ranges from about 50% to 75% by weight, preferably from 60% to 70%. The temperature of polymerization is in the range of about 125° F. to 250° F., preferably from 160° F. to 175° F. The hydrocarbons are maintained in the liquefied state under pressures ranging from about 150 to 450 lbs./sq. in. gauge; and the reaction time is about 2 to 30 minutes, preferably about 10 to 20 minutes.

To reach the desired extent of polymerization, the reaction mixture may be passed thru one or a number of reaction zones under operating conditions described.

The polymerization reaction mixture is withdrawn from reactor 6 by way of line 26 to separator 27, wherein separation is effected between the treated hydrocarbons and acid catalyst so that spent acid catalyst may be removed thru line 28.

A portion of spent acid catalyst may be returned to the polymerization reactor by way of pump 29 and line 30, while another portion of the spent catalyst may be withdrawn from the system thru line 31. Fresh acid catalyst is sent to the reactor from line 30'. With the recycled spent catalyst may also be recycled some of the unseparated reaction mixture emulsion.

The treated hydrocarbon product separated from the acid catalyst in separator 27 is passed by line 32 to a washing unit 33, into which a dilute caustic washing agent is introduced by line 34 and the spent washing agent is removed thru line 35. The washing with dilute caustic may be followed by water washing and drying, if needed, to completely remove all treating agents from the hydrocarbons.

Following washing and any drying required, the hydrocarbon polymerization products are passed by pump 36 in line 37 thru a preheater 38 into the catalytic hydrogenation reactor 39 with a suitable amount of admixed hydrogen from inlet 40. The hydrogenation products are withdrawn from the hydrogenator thru outlet line 41 thru cooler 42, and then condensed hydrogenated hydrocarbons are separated from hydrogen gas in separator 43, the gas being removed thru outlet line 44.

Suitable conditions for the hydrogenation are as follows: Temperatures of the hydrogenation lie in the range of about 200° F. to 650° F. A superatmospheric pressure, preferably ranging upwardly from about 200 lbs./sq. in. to about 3,000 lbs./sq. in. gauge is employed. The time of reaction may vary from about 10 to 60 minutes or more. Suitable catalysts for the hydrogenation are finely divided metals, such as nickel or copper, alone or supported on carriers, such as pumice, and certain metal oxides and metal sulfides, notably oxides and sulfides of zinc, magnesium, thorium, chromium, molybdenum, and of similar metals may be employed in place of the elemental metals. The metal oxides and sulfides may be used in a mixed catalyst, preferably immune to sulfur poisoning. In employing the free metal catalysts, the hydrocarbons and hydrogenating gas should be properly free of sulfur, or a desulfurization of the hydrocarbons may be required prior to the hydrogenation.

The hydrogenated hydrocarbons separated from the hydrogenating gas are discharged from the separator 43 thru line 45 into a fractionating unit 46 equipped at the base with a reboiling heat exchanger 47 and a bottom drain 48. This fractionating unit may be constructed in the form of a tower with a sufficient volume and a sufficient number of fractionating plates for making a precise fractionation of the hydrocarbons. It is preferred to collect an intermediate fractional distillate boiling in the range of about 225° F. to 245° F. on intermediate plates in the fractionating column and to collect a separate lighter fraction boiling from about 200° F. to 225° F. on upper plates in the column. Uncondensed vapors may be passed overhead from the fractionating column thru line 49 into a reflux analyzer 50, whence reflux may be returned by line 51 to the upper part of the fractionating column. Uncondensed gases are forwarded by line 52 thru pump 53 to be commingled with lower molecular weight olefins separated in the primary fractionating unit 2 for reaction in the alkylating unit 11. The overhead gases thus obtained from fractionator 46 are substantially saturated $C_4$ hydrocarbons, i. e., mainly isobutane and normal butane.

The intermediate fractional distillate and lighter distillate fractions referred to are withdrawn as side streams from the fractionator 46 by lines 84 and 85 respectively.

In the alkylation unit 11 the mixture of C4 paraffins and lighter olefins properly proportioned are made to react in the presence of a catalyst which fosters alkylation of ethylene with isobutane under suitable conditions to form a good yield of alkylate hydrocarbons boiling between 125° F. and 280° F., and containing a substantial proportion boiling within the boiling range of 130° F. to 138° F. This is accomplished preferably in the following manner: The olefins present in the reaction mixture should be as free as possible of butenes or higher olefins and should contain ethylene in a major proportion. The ratio of ethylene to propylene should be 1.5:1 at a minimum, and preferably 4:1 or higher. The C4 paraffins should be proportioned to the olefins to have an isobutane to olefin ratio of at least 2:1 and preferably 3:1 and higher. The preferred catalyst is a hydrated boron fluoride or boron fluoride mixed with water containing a major proportion of the boron fluoride and preferably at least about 70% thereof. The reaction is carried out at moderate temperatures of the order of about 60° F. to 80° F. and under a super-atmospheric pressure of the order of 100 to 250 lbs./sq. in. gauge to maintain the hydrocarbons in liquid phase. The catalyst is fed in with the hydrocarbons to give a catalyst to hydrocarbon ratio of about 1:1 or 1:2. With average to good operating conditions, the yield of alkylate amounts to about 170% to 230% based on the weight of the olefins.

The catalyst may be supplied to the reactor 11 from the feed inlet 56, and a substantial amount of recycle catalyst may be admixed from line 57 with the fresh catalyst. To reach the desired extent of alkylation, one or several reaction units may be employed, but for the sake of simplicity, a single reactor is illustrated.

From the reactor 11, the reaction mixture is passed by line 58 to separator 59, wherein the hydrocarbon oil product is separated from the spent catalyst by settling. Spent catalyst is withdrawn from the separator thru line 60, from which a portion of the spent catalyst may be discharged thru line 61, and another portion may be recycled to the reactor by pump 62 thru line 57.

The separated alkylation product is removed from the separator thru line 63 into a neutralizer 64 into which is led from line 65 a dilute neutralizing alkaline wash agent for removal of any acid or catalyst left in the alkylation product. The spent washing agent is removed from the neutralizer by drain pipe 66.

The washed alkylate is removed from the neutralizer by line 67 and pump 68 to a fractionating unit 69 for the desired separation of alkylation products.

The fractionating unit 69 may be in the form of a fractionating column provided with a suitable number of plates, with refluxing means 70, and reboiling means 71. By equipping the fractionator with a sufficient number of plates and maintaining a sufficiently high reflux ratio, a very satisfactory fractionation is obtained to recover the precise alkylate products which are most suitable for combination with higher boiling hydrogenated copolymer products described. A typical fractionation of the total alkylate obtained in the described alkylation procedure gave the following cuts:

| Cut number | Boiling range, °F. | Vol. per cent yield |
|---|---|---|
| Gas | | 0.31 |
| (1) | Up to 110 | 2.36 |
| (2) | 110–130 | 8.0 |
| (3)* | 130–138 | 46.8 |
| (4) | 138–160 | 5.7 |
| (5) | 160–300 | 39.5 |

The most desirable cut for the purpose of formulating superior aviation fuels is particularly the one boiling in the range of about 130° F. to about 138° F., indicated by the asterisk, hence the quality of the alkylate product may be judged by the proportion of this cut yielded. This preferred intermediate boiling range alkylate product may be collected on an intermediate plate in the fractionating column 69 to be withdrawn as a side stream thru line 72, so that it may be combined in a desired proportion with the preferred intermediate hydrogenated copolymer fraction boiling mostly in the range of 225° F. to 245° F., and which is withdrawn as a side stream from the fractionating unit 46 thru line 84.

Uncondensed gas led overhead from the fractionator 69 thru line 73 into refluxing means 70 is subjected to sufficient cooling and condensation to permit mostly unconverted C2 and C3 hydrocarbons to remain in the gas phase. This residual gas may be sent by lines 74 and 75 to line 15, then to the heating coil 16, and any excess of this gas may be removed from the system thru line 76. Reflux is returned from the refluxing means 70 by line 77 to the upper part of the fractionator 69. In the upper part of the fractionating column a cut may be collected of butanes and removed by line 78 for use as a charging stock in an isomerization to prepare more isobutane as needed. High boiling bottoms are withdrawn from the fractionator 69 by drain 79.

Liquid condensate fractions collected in the fractionating units 46 and 69 other than the preferred cuts mentioned also contain valuable fuel ingredients that may be recovered for use in motor fuels, or commercial aviation fuels, e. g., gasoline fuels that are not required to surpass a 100 octane rating.

To further illustrate the invention, the following example is given on specific runs and results which are not to be considered as limiting the invention.

*Example*

A C4 cut obtained by fractionating a normally gaseous hydrocarbon feed contained approximately 17.6% of isobutylene, 23.6% normal butane, 29.4% isobutane, and 29.4% normal butylenes. This cut was subjected to polymerization at 165° F. under a pressure of 175 lbs./sq. in. with 69% sulfuric acid. 20 volumes of recycle acid were used to one volume of fresh feed. The contact time was about 15 minutes in the polymerization reactor. The polymer yield obtained was 140 volumes per cent on the basis of the isobutylene. Following separation of the acid catalyst and neutralization of the treated hydrocarbons, the hydrocarbons were subjected to hydrogenation at 600° F. under a pressure of 3,000 lbs./sq. in. with a contact catalyst containing a mixture of zinc oxide, magnesium oxide, and molybdic oxide partially sulfurized. After the separation of the excess hydrogenating gas, the hydrogenated hydrocarbons were fractionated in a distillation column wherein two cuts were made. The lighter of these cuts boiled substantially in the range of about 210° F. to 220° F., and the heavier boiled in the range of about 225° F. to 250° F. Each of these cuts was removed in a separate side stream from a distillation column. The gas removed overhead from the distillation column contained no substantial amount of butenes but was composed substantially of normal and isobutane.

The normal butane-isobutane hydrocarbon mixture obtained by separation from the hydrogenated copolymerization products described was added to an ethylene cut fractionated from the initial feed. This ethylene cut contained four mols of ethylene to one of propylene, and a sufficient amount of the butanes substantially free of butenes was added to make the isobutane to olefin ratio amount to about 3:1. The resulting mixture was treated in an alkylation unit under 200 lbs./sq. in. pressure at a temperature of 70° F. with a catalyst composed of 78% boron fluoride and 22% water to obtain an alkylate which after purification and upon distillation was found to have the following distillation characteristics:

|  | °F. |
|---|---|
| Initial boiling point | 127 |
| 10% distilled off at | 142 |
| 50% distilled off at | 161 |
| 90% distilled off at | 226 |
| Final boiling point | 268 |

In the distillation of the alkylation product, a reflux ratio of about 10:1 was used in a distillation column containing 10 plates so as to segregate with good precision a cut having a boiling range of about 130° F. to 138° F. This particular alkylate cut was indicated to contain a substantial amount of 2,3-dimethyl butane. When tested in a C. F. R. engine it was found to have an A. S. T. M. octane number of about 93 to 94.

When the alkylate cut boiling substantially within the range of 130° F. to 138° F. was combined with the hydrogenated copolymer fraction boiling substantially within the range of 225° F. to 245° F. in ratios of 10 to 80, 30 to 70, and 50 to 50 per cent by volume, fuel compositions were obtained which gave amazingly excellent performance in a supercharged aviation engine. These fuel compositions, blended with 3 cc. of tetraethyl lead per gallon, were found to give a knock-free performance equivalent to that of iso-octane (100 A. S. T. M. octane rating) blended with as much as 6 cc. of tetraethyl lead per gallon under indicated mean effective pressures ranging upwardly from 233 lbs./sq. in.

It was thus determined that the operations of hot acid polymerization followed by hydrogenation on a $C_4$ cut gave an optimum yield of the desired high boiling isoparaffins and at the same time furnished very expediently the required saturated $C_4$ hydrocarbons which made the alkylation of ethylene and propylene work out satisfactorily. Also, it was thus determined that the major products derived from the polymerization in combination with the predominant alkylation products formed a superior aviation fuel. Thus, the present process proved satisfactory for eliminating difficulties of separating hydrocarbons from refinery gas mixtures and for obtaining a high overall efficiency in the conversion of the various normally gaseous hydrocarbons ordinarily present in refinery gases to the most valuable liquid fuels.

The present invention is not to be limited by any theory on reactions involved nor by any particular examples given for the purpose of illustration. Any modifications coming within the spirit of the invention are intended to be included within the scope thereof.

I claim:

1. In a process for preparing a high anti-knock aviation fuel from normally gaseous hydrocarbons, the steps of copolymerizing the olefins in a butylene-butane cut by a hot sulfuric acid catalyst to form iso-octenes boiling predominantly above 225° F., hydrogenating the hydrocarbons from the polymerization treatment, fractionating the resulting hydrogenated hydrocarbons to separate therefrom saturated normally gaseous hydrocarbons constituted of isobutane and butane and a liquid isoparaffinic fraction boiling predominantly above about 225° F., alkylating olefins in a $C_2$ to $C_3$ cut with said separated isobutane-butane fraction in the presence of a boron fluoride-water catalyst under suitable conditions to form an alkylate boiling mainly above 130° F., and combining a portion of said alkylate with said isoparaffinic fraction boiling above 225° F.

2. A process for preparing a high anti-knock aviation fuel, which comprises converting $C_4$ olefins in a mixture with normal butane and isobutane to form iso-octenes boiling mainly above 225° F. by polymerization in the presence of a hot sulfuric aid catalyst, separating resulting polymers and residual unreacted normally gaseous $C_4$ hydrocarbons from the catalyst, hydrogenating all of said separated hydrocarbons, adding said normally gaseous hydrocarbons substantially free of $C_4$ olefins, after separation from the total products of the hydrogenation step, to ethylene undergoing alkylation with isobutane, and combining resulting alkylated ethylene with hydrogenated iso-octenes boiling mainly above 225° F. recovered from the hydrogenated polymers.

3. A process for preparing an aviation gasoline, which comprises copolymerizing liquefied butenes in the presence of butanes with a hot sulfuric acid catalyst at about 125° F. to 250° F., hydrogenating hydrocarbons separated from said catalyst following the copolymerization, fractionating the hydrogenated hydrocarbons to recover a liquid isoparaffinic fraction boiling mainly in the range of 225° F. to 245° F. and residual butanes, alkylating ethylene with isobutane in said residual butanes using boron fluoride and water as the catalyst at about 60° F. to 80° F., and combining with said liquid isoparaffinic fraction a resulting alkylate boiling mainly in the range of 130° F. to 138° F.

4. In a process for preparing a high anti-knock aviation fuel from normally gaseous hydrocarbons, the steps of submitting a mixture of $C_4$ olefins and paraffins to a hot sulfuric acid polymerization treatment to form iso-octenes boiling predominantly above 225° F., hydrogenating the hydrocarbons from the polymerization treatment, fractionating the resulting hydrogenated hydrocarbons to separate therefrom normally gaseous hydrocarbons consisting essentially of n-butane and isobutane and a liquid isoparaffinic fraction boiling predominantly above 225° F., alkylating $C_2$ to $C_3$ olefins with said separated butane-isobutane fraction, and combining the alkylate thus formed with said isoparaffinic fraction boiling predominantly above 225° F.

PHARIS MILLER.